2,891,916
ION-EXCHANGE RESINS CONTAINING THIOL GROUPS

Jesse C. H. Hwa, Levittown, Pa., assignor to Rohm & Haas Company, Philadelphia, Pa., a corporation of Delaware No Drawing. Application February 8, 1956
Serial No. 564,135

6 Claims. (Cl. 260—2.2)

This invention relates to ion-exchange resins which contain thiol groups as their functional, ion-adsorbing groups, and which are particularly useful for the adsorption of heavy metals, especially silver. This invention also relates to an improved process for making these resins.

An object of this invention is to provide an economical and efficient method of making ion-exchange resins which are essentially insoluble, cross-linked copolymers of a monovinyl aromatic hydrocarbon to the aromatic nuclei of which are attached functional, ion-adsorbing thiol groups.

Another object is to provide a method for making similar resins except that the functional ion-adsorbing groups are mixed, some being thiol and others being sulfonic.

Still another object is to provide such ion-exchange resins having either thiol or thiol plus sulfonic, functional, ion-adsorbing groups.

The process of this invention is believed to be an improvement over older methods (cf. Gregor et al., J. Am. Chem. Soc. 77, p. 3675 (1955)). It comprises first reacting particles of an insoluble, cross-linked copolymer of a monovinyl hydrocarbon and a copolymerizable cross-linking compound containing two or more non-conjugated vinylidene groups, $CH_2=C<$, with chlorosulfonic acid and then reducing the resultant compound by means of nascent hydrogen. The course of the reaction can be better understood from the following typical representation wherein an insoluble copolymer of styrene is reacted first with chlorosulfonic acid and the resultant product is thereafter reduced with nascent hydrogen which is preferably produced by the reaction of tin and hydrochloric acid:

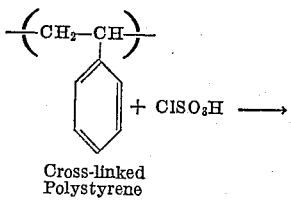

Cross-linked Polystyrene

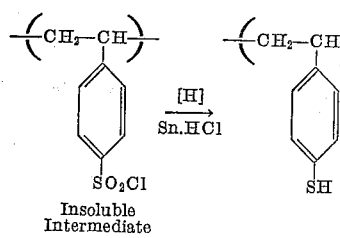

Insoluble Intermediate

The initial cross-linked copolymers are made by copolymerizing a mixture of a monovinyl hydrocarbon and a copolymerizable, cross-linking agent which contains two or more non-conjugated vinylidene groups of the structure, $CH_2=C<$. Suitable monovinyl compounds include styrene, which is much preferred, vinyltoluene, vinylnaphthalene, ortho-, meta-, and paraethyl styrenes, vinylanthracene, and homologues and isomers of the above. Suitable copolymerizable, cross-linking agents include divinylbenzene, which is much preferred, divinyltoluenes, divinylnaphthalenes, divinylethylbenzenes, divinylxylenes, trivinylbenzenes, diallyl esters such as diallyl phthalate and doubly unsaturated esters such as ethylene glycol diacrylate and dimethacrylate. What is required is that the cross-linking agent be copolymerizable with the monovinyl compound and that it contain a plurality of $CH_2=C<$ groups. As little as 0.5%, on a molar basis, of the cross-linking agent and as much as equal parts of the monovinyl compound and the cross-linking agent, on the same basis, can be used; but it is preferred that the cross-linker constitute from 0.5% to 15% of the copolymerizable mixture on a molar basis. Obviously mixtures of two or more monovinyl compounds and two or more cross-linking agents can be copolymerized if necessary or desirable.

The insoluble, cross-linked copolymers can be prepared by polymerizing the monomeric mixtures in bulk, in a solvent, in emulsion, or in suspension. Suspension polymerization, wherein a copolymerizable mixture is suspended by agitation in a medium such as water which is not a solvent for the monomers and is therein polymerized, is much preferred because it gives rise to products which are in the form of small discrete beads or spheroids. Since the copolymerization reaction is accelerated by heat and catalysts of the free-radical type, it is advisable to employ any convenient temperature above 50° C.—preferably a temperature from 50° to 90° C. in the case of suspension polymerization—and to use a catalyst. Suitable catalysts include dimethyl azobisisobutyrate, α,α'-bisazoisobutyronitrile, benzoyl peroxide, acetyl peroxide, lauroyl peroxides, tert-butyl hydroperoxide, ditert-butyl peroxide, stearoyl peroxides, and "persalts" such as ammonium perborate and ammonium persulfate. The catalysts are used in amounts from 0.2% to 5%—and preferably from 0.5% to 2%—based on the weight of the polymerizable compounds.

In the next step the particles of resin are reacted with chlorosulfonic acid. It is recommended that an excess—of the order of 100%—of the chlorosulfonic acid be used over that stoichiometrical amount necessary to provide one chlorosulfonyl group for each aromatic nucleus in the cross-linked resin. This stoichiometric reaction may be expressed as follows:

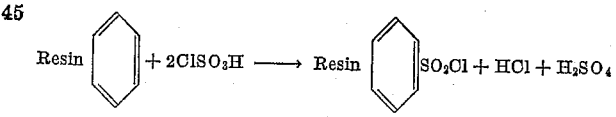

As is evident, two moles of chlorosulfonic acid constitute the minimum stoichiometrical amount necessary to provide one chlorosulfonyl group for each aromatic nucleus as stated above. If only one mole of chlorosulfonic acid was used, the result would be the formation of sulfonic acid groups, $-SO_3H$, on the resin instead of thiol groups, $-SO_2Cl$. If the previously recommended excess, namely 100 percent, were to be used, this would mean twice the stated minimum, or four moles. In the example which is set forth below, 1.5 moles of chlorosulfonic acid is reacted with 0.5 mole of the resin, a relationship of 3:1.

The reaction takes place readily with liberation of heat; and for this reason it is advisable to have cooling means available. It is also recommended that the particles of resin be immersed in an organic liquid, such as carbon tetrachloride, or ethylene dichloride which causes the beads to swell, as a result of which they react more thoroughly with the chlorosulfonic acid. After the reaction is essentially complete, the particles of resin are separated from the reaction mixture, as, for example, by filtration, and are washed with an organic liquid such as toluene or ethylene dichloride.

In the next procedural step, the particles of resin which now contain chlorosulfonyl groups are suspended in a strong mineral acid such as hydrochloric or sulfuric, and a finely divided metal, such as tin, iron, or zinc, is added. Hydrogen is formed by the reaction of the metal and the acid and this nascent hydrogen reduces the chlorosulfonyl groups, $-SO_2Cl$, to thiol groups, $-SH$. Best results have been obtained to date through the use of powdered tin and concentrated hydrochloric acid.

It should be noted that some of the chlorosulfonyl groups may be hydrolyzed to sulfonic acid groups, $-SO_3H$. This is not, however, a disadvantage. Rather it is advantageous because the presence of some sulfonic acid groups results in a resin which is more hydrophilic and which, consequently, hydrates more readily in actual ion-adsorbing operations.

After the reduction reaction, the particles of resin are separated from the reaction mixture and are thoroughly washed. Furthermore, the resin may be steam-distilled in order to remove any organic liquid which may have been imbibed by the particles.

The following example, in which all parts are by weight, further illustrates the novel process for making the improved resins of this invention:

*Example*

A. Into a reactor equipped with thermometer, agitator and reflux condenser were charged 6000 parts of water and 600 parts of a 1.5% aqueous solution of magnesium silicate. To the stirred solution was added 1480 parts of styrene, 160 parts of the technical grade of divinylbenzene (equivalent to approximately 64 parts of divinylbenzene and 96 parts of ethylstyrene) and 16 parts of benzoyl peroxide. The stirred mixture was heated to 90° C. and held there for 1½ hours after which it was held at refluxing temperature for an additional period of 1½ hours. The mixture was cooled to room temperature and the spheroidal particles of resin were filtered off, thoroughly washed and finally dried in an oven at 125° C.

B. Into a reactor equipped with agitator and thermometer were charged 53 parts (0.5 mole) of the particles of resin prepared as described above. Next, 400 parts of ethylene dichloride were added and the mixture was stirred at room temperature for one-half hour, during which the particles increased in size. A solution of 175 parts of chlorosulfonic acid (1.5 moles) and 50 parts of ethylene dichloride was added slowly over a period of an hour while the temperature of the reaction mixture was held at 10° to 20° C. by means of an ice-water bath. Stirring at ambient temperature was continued for 8 hours. The particles of resin were then separated and were washed thoroughly with ethylene dichloride. A dried sample of the product contained 16.5% sulfur.

C. Into the same type of reactor was charged 1180 parts of concentrated hydrochloric acid (density=1.178) and the chlorosulfonated particles prepared as above. The mixture was stirred and maintained at 20° to 25° C. by means of an ice-water bath while 288 parts of granular tin was slowly added. The evolution of hydrogen was steady; and after all the tin was added the temperature was raised to 80° C. and was held at 75° to 80° for 8 hours. The reaction mixture was then cooled and filtered. The particles of resin were thoroughly washed with water and were then steam-distilled in order to strip off imbibed ethylene dichloride.

The ion-exchange resin had a total cation-exchange capacity of 5.7 milliequivalents per gram dry including a salt-splitting capacity of 1.43 milliequivalents per gram dry. The salt-splitting capacity is due to the presence of sulfonic acid groups on some of the aromatic nuclei; the difference between the total cation-exchange and salt-splitting capacities—i.e., 4.3 milliequivalents per gram dry—is a measure of the thiol capacity. The resin was particularly efficient for the adsorption of silver and had a capacity for removing silver from a 0.1 N silver nitrate solution of 4.46 milliequivalents/gram dry.

Many resins were prepared having various ratios of copolymerized monovinyl hydrocarbon and cross-linking agents. All were similar in that they had a specificity for silver.

I claim:

1. A process for preparing ion-exchange resins which comprises immersing in an organic liquid, which is a member of the class consisting of ethylene dichloride and carbon tetrachloride, an insoluble cross-linked copolymer of a mixture of an aromatic monovinyl hydrocarbon and a copolymerizable aromatic polyvinyl hydrocarbon cross-linking agent which contains at least two nonconjugated vinylidene groups, $CH_2=C<$, said cross-linking agent being present in an amount equal to 0.5 to 50 molar percent based on the total number of moles of said monovinyl and polyvinyl hydrocarbons, then reacting at least two moles of chlorosulfonic acid with each mole of said copolymer, thereafter suspending the resultant product in hydrochloric acid, and adding tin thereto so as to form nascent hydrogen which reduces chlorosulfonyl groups to thiol groups.

2. The process of claim 1 in which the monovinyl aromatic hydrocarbon is a member of the class consisting of styrene, vinyltoluene, vinylnaphthalene, ortho-ethylstyrene, meta-ethylstyrene, para-ethylstyrene and vinylanthracene, and the polyvinyl aromatic hydrocarbon is a member of the class consisting of divinylbenzene, divinylnaphthalenes, divinylethyl benzenes, divinylxylenes and trivinylbenzenes.

3. The process of claim 2 in which the monovinyl aromatic hydrocarbon is styrene and the polyvinyl aromatic hydrocarbon is divinylbenzene.

4. A process for preparing ion-exchange resins which comprises immersing in an organic liquid, which is a member of the class consisting of ethylene dichloride and carbon tetrachloride, an insoluble cross-linked copolymer of a mixture of an aromatic monovinyl hydrocarbon and a copolymerizable polyvinyl aromatic hydrocarbon cross-linking agent which contains at least two nonconjugated vinylidene groups, $CH_2=C<$, said cross-linking agent being present in an amount equal to 0.5 to 50 molar percent based on the total number of moles of said monovinyl and polyvinyl hydrocarbons, then reacting the copolymer with an excess of chlorosulfonic acid which is sufficient to provide at least one chlorosulfonyl group for each aromatic nucleus in the cross-linked resin, and thereafter treating the resultant product with hydrochloric acid and tin, whereby nascent hydrogen is liberated and causes the reduction of some of the chlorosulfonyl groups to thiol groups while other chlorosulfonyl groups are hydrolyzed to sulfonic acid groups.

5. The process of claim 4 in which the monovinyl aromatic hydrocarbon is a member of the class consisting of styrene, vinyltoluene, vinylnaphthalene, ortho-ethylstyrene, meta-ethylstyrene, para-ethylstyrene and vinylanthracene, and the polyvinyl aromatic hydrocarbon is a member of the class consisting of divinylbenzene, divinylnaphthalenes, divinylethylbenzenes, divinylxylenes and trivinylbenzenes.

6. The process of claim 5 in which the monovinyl aromatic hydrocarbon is styrene and the polyvinyl aromatic hydrocarbon is divinylbenzene.

References Cited in the file of this patent

UNITED STATES PATENTS

| | | |
|---|---|---|
| 2,500,149 | Boyer | Mar. 14, 1950 |
| 2,725,368 | Reynolds | Nov. 29, 1955 |
| 2,778,813 | Gaspar | Jan. 22, 1957 |

OTHER REFERENCES

Gregor et al.: J. Am. Chem. Soc., 77, 3676 (July 1955).

Whitmore: "Organic Chemistry," page 167, Van Nostrand (1937). (Copy in Scientific Library.)